(12) United States Patent
Addink et al.

(10) Patent No.: US 7,330,796 B2
(45) Date of Patent: Feb. 12, 2008

(54) METHODS AND APPARATUS FOR USING WATER USE SIGNATURES AND WATER PRESSURE IN IMPROVING WATER USE EFFICIENCY

(75) Inventors: John W. Addink, Riverside, CA (US); Sylvan Addink, Iowa City, IA (US); Tony Givargis, Irvine, CA (US)

(73) Assignee: Aqua Conserve, Inc., Riverside, CA (US)

( * ) Notice: Subject to any disclaimer, the term of this patent is extended or adjusted under 35 U.S.C. 154(b) by 0 days.

(21) Appl. No.: 11/217,252

(22) Filed: Aug. 31, 2005

(65) Prior Publication Data

US 2006/0009928 A1 Jan. 12, 2006

Related U.S. Application Data

(63) Continuation-in-part of application No. 10/297,146, filed as application No. PCT/US00/15480 on Jun. 5, 2000, now Pat. No. 6,963,808.

(51) Int. Cl.
*G01F 1/00* (2006.01)
(52) U.S. Cl. .............................. 702/45; 702/44; 702/50; 702/55
(58) Field of Classification Search ................. 702/45, 702/44, 50, 55
See application file for complete search history.

(56) References Cited

U.S. PATENT DOCUMENTS

| 5,006,845 | A | * | 4/1991 | Calcar et al. ................. 367/81 |
| 5,040,409 | A | | 8/1991 | Kiewit |
| 5,721,383 | A | | 2/1998 | Franklin et al. |
| 5,971,011 | A | | 10/1999 | Price |
| 6,101,451 | A | | 8/2000 | Smith et al. |
| 6,236,953 | B1 | | 5/2001 | Segal |

* cited by examiner

*Primary Examiner*—John Barlow
*Assistant Examiner*—Stephen J. Cherry
(74) *Attorney, Agent, or Firm*—Fish & Associates, PC (57) ABSTRACT

A method to identify a water flow anomaly in a system having first and second water using devices to generate baseline data that preferably has water use signatures and corresponding water pressure information regarding the water using devices; comparing the baseline data with actual water usage signatures and corresponding actual water pressure information to identify a flow anomaly with the water using devices; and providing information on the flow anomaly to an individual. It is especially contemplated that baseline data are generated for multiple devices coupled to a common water supply system, with baseline data from two or more water using devices compared against future water use patterns of the same devices. Apparatus to accomplish these tasks is preferably housed in an irrigation controller, which may be advantageously coupled to a flow meter.

17 Claims, 7 Drawing Sheets

METHODS AND APPARATUS FOR USING WATER USE SIGNATURES AND WATER PRESSURE IN IMPROVING WATER USE EFFICIENCY

This application is a continuation-in-part of application Ser. No. 10/297,146 filed on Aug. 11, 2003, now U.S. Pat. No. 6,963,808, which is a 371 of International Application PCT/US00/15480 filed on Jun. 5, 2000, and which designated the U.S.

FIELD OF THE INVENTION

The field of the invention is water flow meters.

BACKGROUND OF THE INVENTION

In arid areas of the world water is becoming one of the most precious natural resources. Meeting future water needs in these arid areas may require aggressive conservation measures. Each individual living or working in these arid areas should take the initiative to start conserving water. Most individuals are aware of some of the steps they can take to conserve water, such as installing low or ultra low flush toilets, installing water saving shower heads, sweeping rather than hosing off the driveway, checking for leaks in the water system and irrigation system, and irrigating the landscape efficiently. However, with the last two steps, many individuals may not be aware of leaks in their water lines or irrigation systems and/or they are not aware of what measures they can take to irrigate their landscapes more efficiently.

Signature data is data that is specific to a certain individual or thing and is based on a particular characteristic or quality that is specific to that individual or thing. Signature analysis (also known as flow trace analysis) was used by government agencies to obtain information about water use patterns in residences. Flow trace analysis is described in various publications, including DeOreo, W. B., J. P. Heaney, and P. W. Mayer. 1996a. Flow Trace Analysis to Assess Water Use. *Jour. AWWA*, 88 (1):79-90, Dziegielewski, B., E. M. Opitz, J. C. Kiefer, D. D. Baumann, M. Winer, W. Illingworth, W. O. Maddaus, P. Macy, J. J. Boland, T. Chestnutt, and J. O. Nelson. 1993b. Evaluating Urban Water Conservation Programs: *A Procedure's Manual*. Denver, Colo.: AWWA, and Mayer, P. W. and W. B. DeOreo. 1995. Process Approach for Measuring Residential Water Use and Assessing Conservation Effectiveness. *Proc. Of 1995 Annual Conference*. Anaheim, Calif.: AWWA. The government agencies generally gathered this information to assist them to better understand the water use patterns in residences. However, this information was not fed back to individuals nor used for feedback to an irrigation controller and/or was not easily accessible to individuals to assist them in achieving greater efficiency in their water use.

The present invention uses signature data with water pressure data, generated from water using devices that are executed from start to finish, to assist individuals to improve water use efficiency. The signature data for all devices at a given water using site is preferably obtained from only a single water meter, which may advantageously comprise the meter installed by the water district to service the site.

There are methods, other than signature data with water pressure data, that can be used to determine the water used during execution of water using devices. One such method is disclosed in U.S. Pat. No. 5,721,383 issued February 1998 to Franklin, et al. A flow meter is put on each water line that transfers water to the water using device. However, due to the cost, this flow meter system would likely only be used for research purposes, since it would not be feasible for homeowners to install flow meters for each of their water using devices.

Water system leaks can result in water waste of as high as 100 gallons per day. Various apparatus have been patented to detect leaks in water lines and irrigation systems. A leak detection device is discussed in U.S. Pat. No. 5,040,409 issued August 1991 to Kiewit. An acoustic sensor and associated electronic circuitry are used to determine when a catastrophic leak occurs in an irrigation system. This apparatus would only detect catastrophic leaks and many leaks are not of a catastrophic nature but still may result in a substantial waste of water over an extended period of time.

Another leak detection device is discussed in U.S. Pat. No. 5,971,011 issued October 1999 to Price. Information is supplied to a microprocessor, which determines a maximum allowable quantity of water that may flow over a specified period of time. If the maximum amount of water is exceeded, during the set period of time, then the flow of water is automatically shut off. The shut off device has to be manually reset to allow the water to flow again. As with the patent, mentioned in the previous paragraph, so also with this patent, it would most likely only shut off the flow of water when a catastrophic leak occurred. Individuals would not want the flow of water shut off unless a leak had likely occurred. Therefore, they would set the water quantity amount high so activation of the automatic shutoff didn't occur, when only slightly excessive water was used during the specific set time period.

A better leak detection method would be able to detect small leaks as well as catastrophic leaks, and would feed this information back to individuals so they are aware that there is a leak and provide feedback to an irrigation controller. The present invention meets these requirements.

SUMMARY OF THE INVENTION

The present invention provides a method for identifying a flow anomaly in a system having first and second water using devices, comprising: generating baseline data comprising water use signatures and corresponding water pressure information regarding the water using devices; comparing the baseline data with actual water usage signatures and corresponding actual water pressure information to identify a flow anomaly, with the water using devices; and providing information on the flow anomaly to an individual or feedback to an irrigation controller.

Identifying anomalies can be useful in numerous ways, including discovering problems that need fixing, reducing waste, etc.

All water using devices are contemplated, including those employed at residential, commercial, industrial, agricultural or other types of sites. With respect to households, for example, contemplated devices include internal devices such as showers, toilets, faucets, and home appliances such as washing machines, as well as external devices such as irrigation systems, pools and spas, and so forth. Of course, the various anomalies that can be detected depend in part on the types of water using devices in the system. Leaks and improperly closed valves can be detected for any of the devices, while broken irrigation sprinkler lines, plugged irrigation sprinkler heads, and so forth are specific for irrigation systems. It is especially contemplated that baseline data are generated for multiple devices coupled to a common water supply system, with baseline data from two or more water using devices compared against future water use patterns of the same devices. Such multiple comparisons can be especially useful, where multiple devices may be operating concurrently.

In another aspect of preferred embodiments the apparatus to accomplish these tasks is housed in an irrigation controller, which may advantageously be coupled to a flow meter so that flow data is transmitted from the flow meter directly to the irrigation controller. It is especially contemplated that the controller can operate a warning signal generator that provides an alert upon determination of the existence of a flow anomaly. All of the functions are preferably executed by a microprocessor executing software code.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
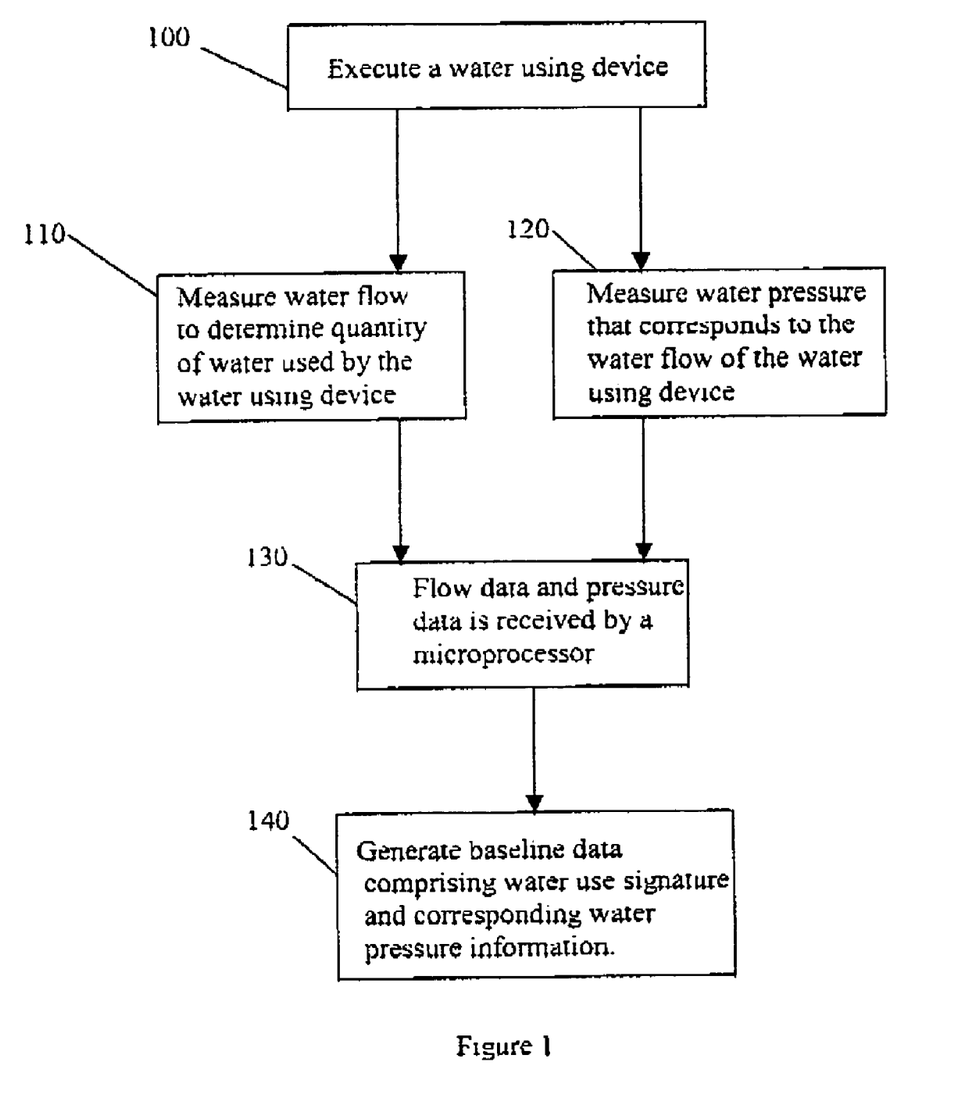
FIG. 1 is a flow chart of steps involved in the determination of a water use signature according to a preferred embodiment.

In FIG. 1 a method for determining a water use signature for a water using device generally comprises the following steps: executing a water using device 100; measuring water flow to determine the quantity of water used by the water using device 110; measuring the corresponding water pressure 120, transmitting flow data and pressure data to a microprocessor 130; and the microprocessor generating baseline data comprising water use signature and corresponding water pressure information 140. The microprocessor is programmed to store the baseline data. The microprocessor will then compare the baseline data with actual water usage signature and corresponding actual water pressure information to identify a flow anomaly.

In a preferred embodiment the water use signature of the baseline data 140 is obtained from a single water meter that was preferably installed during original construction at the site. The single meter is used to monitor water usage of all devices on the water system, including, for example, usage inside and outside a residence, business or other water use site. This is best accomplished by running one device at a time, thereby generating successive "clean" baseline data for each device. Alternatively, it is contemplated to install multiple flow meters, each of which may be coupled to one or more devices.

Figure 2:
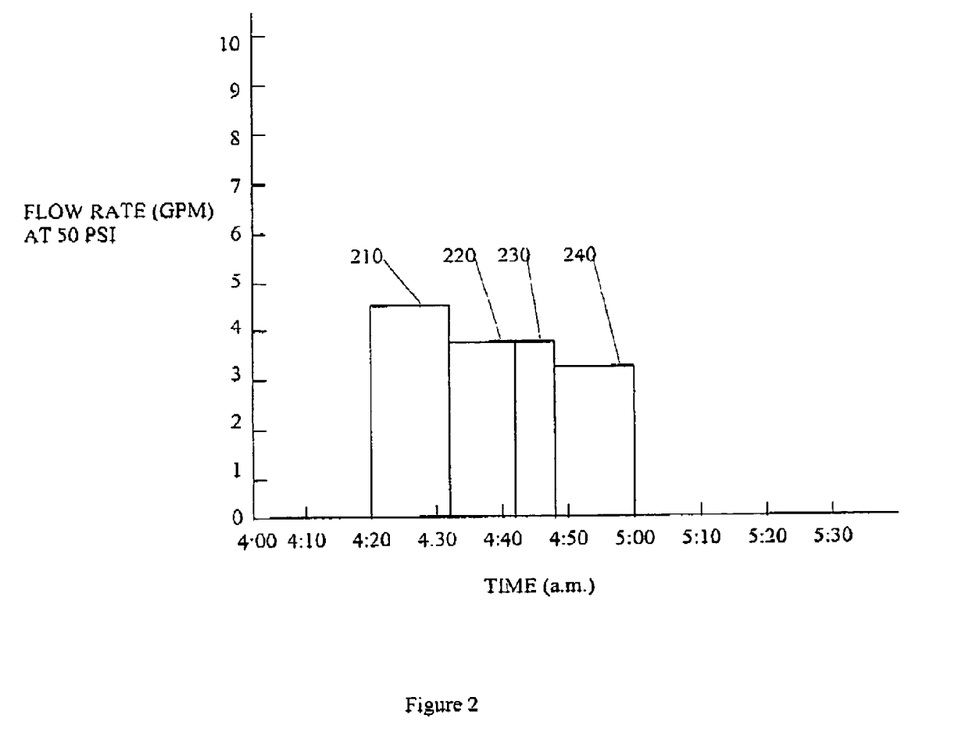
FIG. 2 is a graph of a water use signature derived from operation of an irrigation system at 50 psi.

Assume an irrigation system has four stations, numbered 1, 2, 3 and 4, controlled by an irrigation controller. The various stations are set to run for different lengths of time. In this particular example, the initial start time for station number 1 is at 4:20 a.m. As indicated in FIG. 2, the quantity of water applied varies for stations 1, 2, 3 and 4 and results in different water use signatures 210, 220, 230 and 240, respectively. Of course, baseline water use signatures are preferably obtained, when the irrigation system is operating without leaks or restrictions in the water lines or spray heads.

Figure 3:
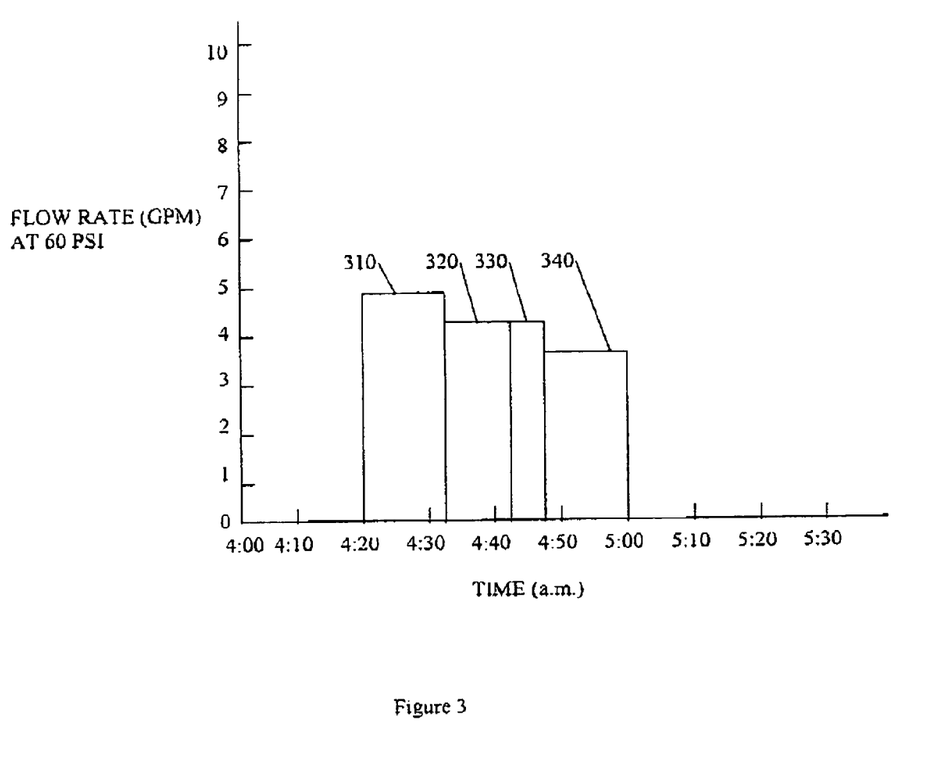
FIG. 3 is a graph of a water use signature derived from operation of an irrigation system at 60 psi.

Water pressure effects water flow rates. With a change in water pressure there is a change in the water flow rate. The water flow rate is proportional to the square root of the water pressure. In FIG. 2, the flow rate for station 2 was approximately 4.5 gpm (gallons per minute) with a water pressure of 50 psi (pounds per square inch). Therefore, with the same water system, if the water pressure was increased to 60 psi then the water flow for station 2 would be approximately 4.9 gpm. FIG. 3 displays the water use signatures 310, 320, 330 and 340 for stations 1, 2, 3 and 4, respectively, when the water pressure was increased from 50 psi to 60 psi.

Improved detection of flow anomalies can be accomplished, by knowing the water pressures that correspond with the water use signatures of various water using devices. Assume that with irrigation station 2, in the previous paragraph, the microprocessor is set to display a flow anomaly warning, when the gallon per minute flow rate varies by at least 5%. Since in the above example, the flow rate for station 2 varied by almost 9% or 4.5 gpm verse 4.9 gpm, the microprocessor would have displayed a warning that a flow anomaly occurred. However, there was no actual flow anomaly, there was only a change in water flow rate due to a change in water pressure. Therefore, if the microprocessor is programmed to take into account the effect pressure has on the flow rate of water, then the detection of flow anomalies can be improved. In this example, one way to accomplish this would be by setting the microprocessor to warn of flow anomalies only if the 5% or greater change in flow rate is due to factors other than flow rate changes that were caused by water pressure.

Figure 4:
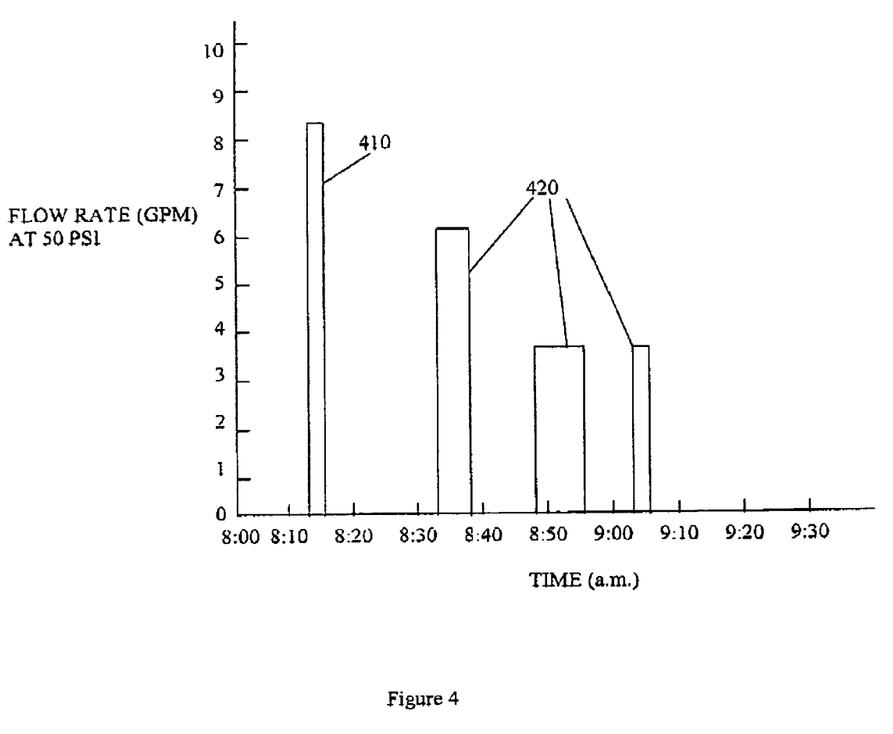
FIG. 4 is a graph of water use signatures derived from flushing of a toilet and the operation of a clothes washer at 50 psi.

FIG. 4 depicts exemplary water use signatures 410 and 420 from the flushing of a toilet and the operation of a clothes washer, respectively, when the water pressure is 50 psi. As mentioned earlier, accurate water use signatures are preferably generated for water using devices, when there is no leakage in the system and no water being used by other devices.

Figure 5:
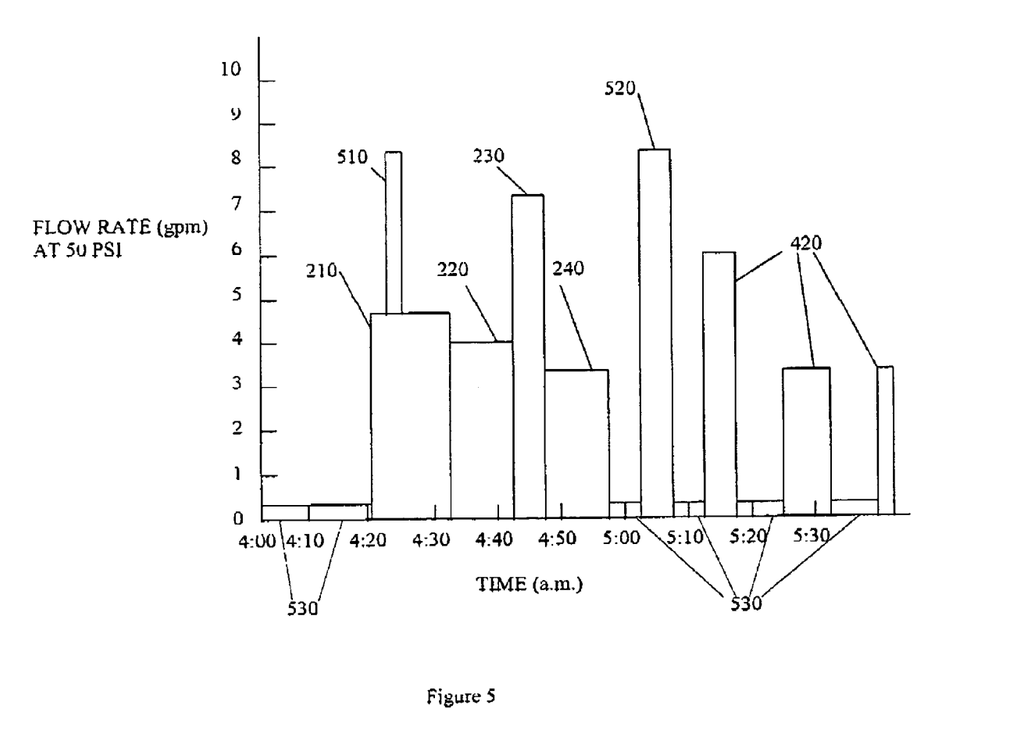
FIG. 5 is a graph of microprocessor generated information provided to an individual to assist in improving water use efficiency.

FIG. 5 is an example of microprocessor generated information that may be provided to an operator or other individual. The term "operator or other individual" is used herein in a very broad sense to include all those persons having an interest in the water usage. This specifically includes home or business owners and any others who are responsible for paying water usage charges. It also includes water district personnel and other employees and consultants at relevant government or private agencies. It is further contemplated that the microprocessor generated information will be sent directly to an irrigation controller. The irrigation controller may be programmed to shut off the water to the irrigated area, when a potential flow anomaly has been detected.

In FIG. 5, the information is displayed in a graphical format, but those skilled in the art will appreciate that the information may alternatively or additionally be displayed in tabular or other formats. With respect to specific signatures, the constancy of water use signature 530 most likely indicates the existence of a slow leak somewhere in the water system. A leaky faucet can result in water waste of 20 to 100 gallons per day. A leaky toilet can result in water waste of 40 plus gallons per day. Water use signatures 220 and 240 may well correspond to water use by successive operation of stations 2 and 4, respectively of an irrigation system. Signature 230 would likely correspond to water flow that would have occurred, if there were a broken line or broken head, when irrigation station 3 was turned on. A broken line or head can easily result in a waste of 5 to 10 gallons of water per minute or more. Water use signature 520 has a flow rate that corresponds to usage of a toilet, (see e.g., toilet signature 410 in FIG. 4), except that the time frame is too long. In this particular instance, the toilet did not shut off properly. There is an indication of an additional water flow 510 occurring at the same time that water use signature 210 is generated. The water flow pattern indicates that the additional water usage was not related to the flow of water through the irrigation system since the start and end time for the water flow pattern 510 was different than the water use signature 210. When compared to signature 410 in FIG. 4, it is evident that the water flow pattern 510, FIG. 5 is due to the flushing of a toilet.

Figure 6:
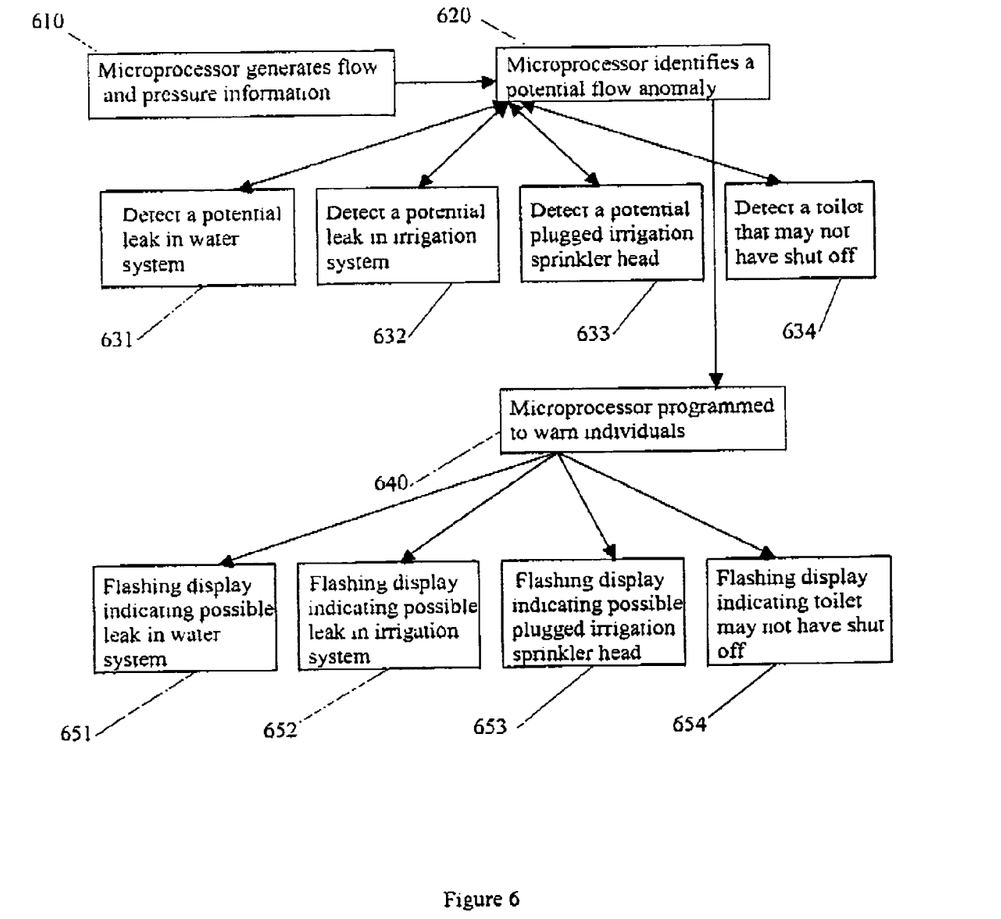
FIG. 6 is a flow chart of steps in generating information, including production of a warning signal.

In FIG. 6, steps in generating information that assist individuals in the detection of water leaks, plugged irrigation sprinkler heads, and other flow anomalies include: the microprocessor generating flow and pressure information 610; identifying a potential flow anomaly 620; which may include one or more of a leak in the water system 631, a leak in the irrigation system 632, a plugged irrigation sprinkler head 633, and a toilet that didn't shut off 634; and the microprocessor programmed to warn one or more individuals 640, when flow anomalies occur 651-654.

The warning may be through any suitable means, including, for example, a flashing display, an alarm mechanism, microprocessor generated information with highlighted water use patterns that do not fit water use signatures that were generated at the water use site, and other warning methods.

Figure 7:
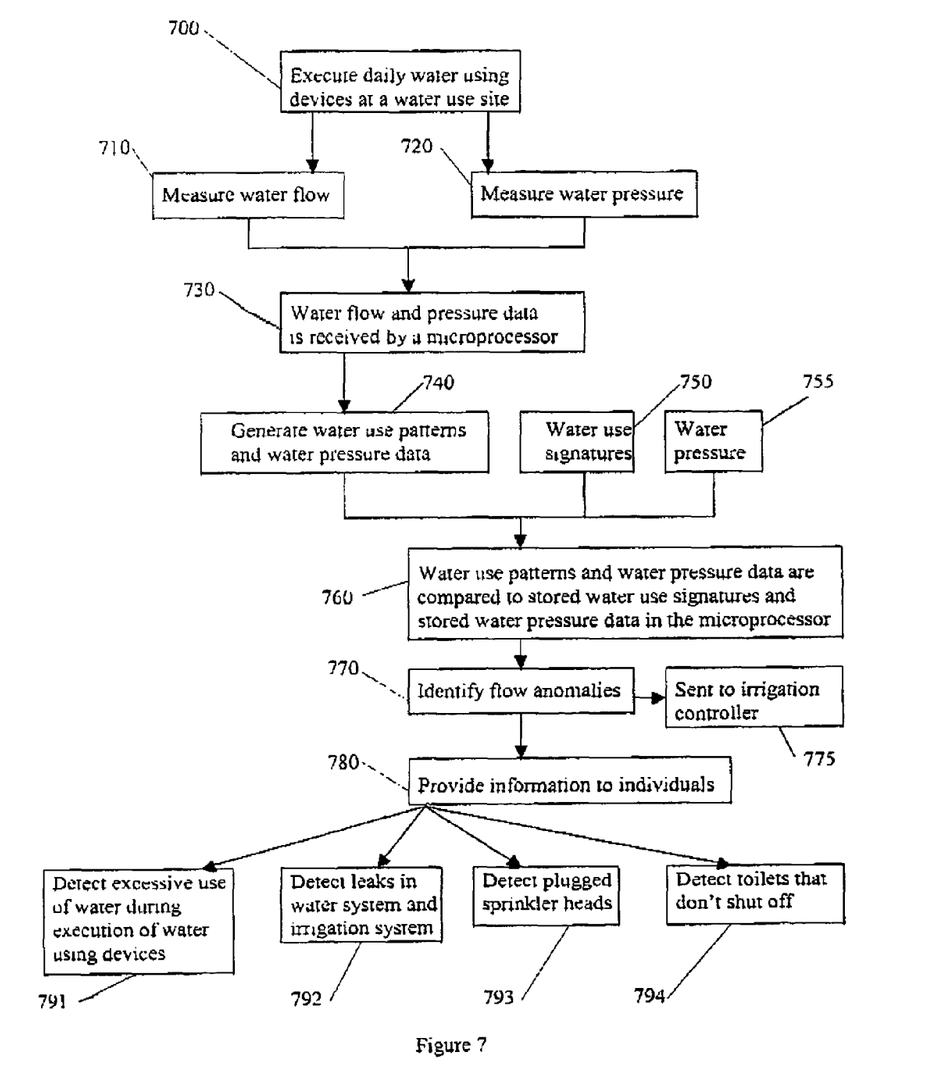
FIG. 7 is a flow chart of steps involved in a preferred embodiment of the present invention.

FIG. 7 is a flow chart of basic steps involved in a preferred embodiment of the present invention. There are daily executions of water using devices at water use sites 700. These water use sites can be residential, commercial, industrial, agricultural or other water use sites. The water using devices may be any presently known or unknown device. At a residential site, water using devices include home appliances such as dish washers and clothes washers; other indoor water using devices such as toilets, showers and faucets, and outdoor devices such irrigation systems, outdoor faucets that may, for example, be used to wash a car or clean off a driveway. Commercial and industrial sites may use some or all of the same devices as may be present at a residential site, but may alternatively or additionally include water cooled machinery, particulate collectors, and so forth.

Other steps in FIG. 7 include measuring water flow 710 and measuring water pressure 720 during the execution of the water using devices, and transmitting that information to a microprocessor 730.

In a preferred embodiment the microprocessor is an integral part of a computer system, and more preferably of an irrigation control system. If the microprocessor is part of an irrigation controller, the microprocessor generated information may advantageously be displayed on the irrigation controller display unit. Alternatively, the microprocessor may be part of a separate unit that has a visual display and/or other means to provide water users or other interested parties with information on flow anomalies. It is especially preferred that the microprocessor receives the water flow and water pressure data directly from the measuring devices. As used herein, the term "directly" means by a direct connection such as through an electric wire. However, the microprocessor may receive the data by other means that does not require a direct connection between the microprocessor and the measuring devices, such as by radio, pager and telephone.

The microprocessor generates water use patterns and water pressure data from actual water flow and corresponding water pressure 740. There are stored water use signatures 750 and stored water pressure data 755 in the microprocessor. The microprocessor then executes software code that compares the generated water use patterns and generated water pressure data to stored water use signatures and stored water pressure data 760 to identify flow anomalies 770. Information, regarding the flow anomalies, can be either sent to the irrigation controller 775 or provided to an operator or other individual 780. If information on the flow anomaly is sent to the irrigation controller, the irrigation controller may be programmed to shut off the water to the irrigated area, when a potential flow anomaly has been detected.

It is especially contemplated that the microprocessor generated information may be utilized in helping an operator or other individual to recognize excessive water usage 791. In one study, water consumption was reduced by as much as 20 gallons per day per individual by regular water consumption feedback (William H. Bruvold, Municipal Water Conservation, *California Water Resources Center*, 1988, P. 40). The microprocessor generated information may also help in identifying possible leaks 792, plugged sprinkler heads 793, and toilets that don't shut off 794. Further, the microprocessor may warn individuals when these or other anomalies are present 640-654, FIG. 6.

Thus, specific methods and apparatus for using water use signatures in improving water use efficiency have been disclosed. It should be apparent, however, to those skilled in the art that many more modifications besides those described are contemplated without departing from the inventive concepts herein. The inventive subject matter, therefore, is not to be restricted except in the spirit of the appended claims.

What is claimed is:

1. A method for identifying a flow anomaly in a system fluidly coupled to a metered water district water line, and having first and second water using devices, comprising:
   generating fist baseline data comprising a first water use signature and corresponding first water pressure information regarding the first water using device;
   comparing the first baseline data with a first actual water usage signature and first actual water pressure information to identify a first flow anomaly with the first device; and
   providing information on the first flow anomaly to an individual.

2. The method of claim 1 wherein the first water using device comprises a home appliance.

3. The method of claim 1 wherein the first water using device comprises an irrigation system.

4. The method of claim 1 further comprising using a single flow meter that compares the baseline data with the actual water usage signature and the actual water pressure information.

5. The method of claim 1, further comprising:
   generating second baseline data comprising a second water use signature and corresponding second water pressure information regarding the second water using device;
   comparing the second baseline data with actual water usage signature and corresponding second water pressure information to identify a second flow anomaly with the second device; and providing information on the second flow anomaly to an individual.

6. The method of claim 5 wherein the second water using device comprises a home appliance.

7. The method of claim 5 wherein the second water using device comprises an irrigation system.

8. The method of claim 5 wherein the first water using device comprises a home appliance and the second water using device comprises an irrigation system.

9. The method of claim 5 further comprising using a single flow meter to perform both comparisons.

10. A system fluidly coupled to a metered water district water line and having a microprocessor that operates code that compares first and second water use patterns against previously established first and second water use signatures, respectively, and corresponding first and second water pressures against previously established first and second water pressures.

11. The system of claim 10 wherein the microprocessor is housed in an irrigation controller.

12. The system of claim 10 further comprising a communication line that transmits flow data from a flow meter directly to the system.

13. The system of claim 10 wherein the first water use pattern corresponds to a leak in a water use device.

14. The system of claim 13 wherein the leak comprises a broken irrigation sprinkler.

15. The system of claim 10 wherein the first water use pattern corresponds to a plugged irrigation sprinkler head.

16. The system of claim 10, further comprising a display that displays real time flow data to an individual.

17. The system of claim 10, further comprising a warning signal generator that alerts an individual upon determination of an existence of a flow anomaly.

* * * * *